US008311874B2

(12) United States Patent (10) Patent No.: US 8,311,874 B2
Gupta et al. (45) Date of Patent: Nov. 13, 2012

(54) SYSTEMS AND METHODS FOR CUSTOMER RELATIONSHIP EVALUATION AND RESOURCE ALLOCATION

(75) Inventors: Atul Kumar Gupta, Maharashtra (IN); Gautam Samanta, Maharashtra (IN)

(73) Assignee: Oracle Financial Services Software Limited, Mumbai (IN)

( * ) Notice: Subject to any disclaimer, the term of this patent is extended or adjusted under 35 U.S.C. 154(b) by 1761 days.

(21) Appl. No.: 11/244,707

(22) Filed: Oct. 6, 2005

(65) Prior Publication Data

US 2006/0224437 A1 Oct. 5, 2006

(30) Foreign Application Priority Data

Mar. 31, 2005 (IN) .......................... 394/MUM/2005

(51) Int. Cl.
*G06Q 10/00* (2012.01)
*G06Q 30/00* (2012.01)
(52) U.S. Cl. ..................................... 705/7.29; 705/7.38
(58) Field of Classification Search .............. 705/7.29, 705/7.38, 7.39
See application file for complete search history.

(56) References Cited

U.S. PATENT DOCUMENTS

| 5,734,890 | A | | 3/1998 | Case et al. .................. 395/605 |
| 6,101,479 | A | * | 8/2000 | Shaw ............................... 705/8 |
| 6,877,034 | B1 | * | 4/2005 | Machin et al. .............. 709/223 |
| 6,915,270 | B1 | * | 7/2005 | Young et al. ................ 705/7.29 |
| 7,149,607 | B2 | * | 12/2006 | Dorey et al. ..................... 701/1 |
| 7,324,954 | B2 | * | 1/2008 | Calderaro et al. .......... 705/7.28 |
| 7,340,408 | B1 | * | 3/2008 | Drew et al. ..................... 705/10 |
| 7,340,409 | B1 | * | 3/2008 | Ulwick ........................... 705/10 |
| 7,376,603 | B1 | | 5/2008 | Mayr et al. |
| 7,519,562 | B1 | * | 4/2009 | Vander Mey et al. ......... 705/500 |
| 2002/0123923 | A1 | | 9/2002 | Manganaris et al. |
| 2002/0184082 | A1 | * | 12/2002 | Nakano et al. ................. 705/10 |
| 2002/0184083 | A1 | * | 12/2002 | Nakano et al. ................. 705/10 |
| 2003/0009373 | A1 | | 1/2003 | Ensing et al. ................... 705/10 |
| 2003/0040954 | A1 | * | 2/2003 | Zelek et al. ..................... 705/10 |
| 2003/0069780 | A1 | | 4/2003 | Hailwood et al. .............. 705/10 |
| 2004/0015386 | A1 | | 1/2004 | Abe et al. ........................ 705/10 |
| 2004/0039631 | A1 | | 2/2004 | Crockett et al. ................ 705/11 |

(Continued)

OTHER PUBLICATIONS

Rossomme, Jeanne. Customer Satisfaction Measurement in a Business-to-Business Context: a Conceptual Framework, 2003, MCB UP Limited, Journal of Business & Industrial Marketing, vol. 18 No. 2, pp. 179-195.*

(Continued)

*Primary Examiner* — Jonathan G Sterrett
*Assistant Examiner* — Stephanie Delich
(74) *Attorney, Agent, or Firm* — Narendra Reddy Thappeta

(57) ABSTRACT

Customer relationships, particularly in a business-to-business environment, are evaluated and enhanced by generating actionable inferences through the measurement and analysis of both customer satisfaction and customer importance. Customer satisfaction information is captured from both an internal channel comprising key internal customer contacts or boundary employees, as well as an external channel comprising representatives from a plurality of identified respondent profile groups. Customer Importance is also considered in the overall analysis and interpretation of the customer satisfaction. By incorporating all the internally reported customer satisfaction, the externally obtained satisfaction figures and the customer importance scores, a framework is provided for the analysis of various relationships which can help to identify relationships that are in critical need of attention, isolate critical areas of improvement, and identify trends across various respondent profiles and lifecycle phases in a manner that optimizes the use of vendor organizational resources.

24 Claims, 7 Drawing Sheets

U.S. PATENT DOCUMENTS

2004/0162752 A1* 8/2004 Dean et al. .................. 705/10
2005/0228713 A1* 10/2005 Manzolillo et al. ............ 705/10

OTHER PUBLICATIONS

Grigoroudis, Politis, Spyridaki, Siskos. Modelling Importance Preferences in Customer Satisfaction Surveys, 2002, Technical University of Crete, Decision Support Systems Laboratory, Chania, Greece, Univeristy of Piraeus, Department of Informatics, Piraeus, Greece.*

Grigoroudis and Siskos. MUSA: a Decision Support System for Evaluating and Analyzing Customer Satisfaction, 2002, Technical University of Crete, Decision Support Systems Laboratory, Chania, Greece.*

Athanassopoulos, Antreas et al. "Behavioural Responses to Customer Satisfaction: An Empirical Study" European Journal of Marketing, vol. 35, No. 5, Jun. 2001, pp. 687-701.

Grigoroudis, E. et al. Modeling Importance Preferences in Customer Satisfaction Surveys, http://www4.fe.uc.pt/mcda56/docs/Papers/Grigoroudis_et_al_PAP.pdf.

Matsatsinis N.F. et al (1999) Customer Satisfaction Using Data Mining Techniques. ESIT '99, The European Symposium on Intelligent Techniques, http://www.erudit.de/erudit/events/esit99/12753_p.pdf.

Rossomme, Jeanne "Customer satisfaction measurement in a business-to-business context: a conceptual framework", *Journal of Business & Industrial Marketing*, vol. 18 No. 2, 2003, pp. 179-195.

Sharma, Subhash et al, "A framework for Monitoring Customer Satisfaction: an Empirical Illustration", *Industrial Marketing Management* vol. 28, pp. 231-243 (1999).

Siskos, Y. et al., "Measuring Customer Satisfaction Using a Collective Preference Disaggregation Model" *Journal of Global Optimization* vol. 12, pp. 175-195 (1998).

Spreng, Richard A. et al. "A Reexamination of the Determinants of Consumer Satisfaction" *Journal of Marketing*, vol. 60, No. 3, Summer, 1996.

Tikkanen, Henrikki et al. "The Concept of Satisfaction in Industrial Markets: A Contextual Perspective and a Case Study from the Software Industry" *Industrial Marketing Management* vol. 29, pp. 373-386 (2000).

Tikkanen, Henrikki et al. "Customer Satisfaction in Industrial Markets: Opening Up the Concept" *Journal of Business and ndustrial Marketing* vol. 17, No. 1, pp. 25-42 (2002).

Walter, Achin et al. (2000). The Impact of Satisfaction, Trust, and Relationship Value on Commitment: Theoretical Considerations and Empirical Results. Online Proceeding: The 2000 IMP Conference, School of Management, University of Bath.

* cited by examiner

SYSTEMS AND METHODS FOR CUSTOMER RELATIONSHIP EVALUATION AND RESOURCE ALLOCATION

RELATED APPLICATIONS

The present application claims priority to Indian Patent Application No. 394/MUM/2005, filed Mar. 31, 2005 entitled "SYSTEMS AND METHODS FOR CUSTOMER RELATIONSHIP EVALUATION AND RESOURCE ALLOCATION", the disclosure of which is incorporated by reference in its entirety.

BACKGROUND OF THE INVENTION

1. The Field of the Invention

The present invention relates to customer relationship management (CRM) and the evaluation and enhancement of customer relationships in a business to business context and, more particularly, the present invention relates to systems methods and computer program products for evaluating and enhancing customer relationships, particularly in a business-to-business environment, by generating actionable inferences through the measurement and analysis of customer satisfaction and customer importance and by prioritizing and optimizing the use of vendor resources.

2. The Relevant Technology

In today's global and increasingly competitive business environment, the management of customer relationships; namely, the identification, acquisition, development and retention of customers, has emerged as the key determinant of business success. This emergence of Customer Relationship Management (CRM) as one of the most prominent fields of management theory and research and an area of focus for organizations has resulted in a shift in the general approach towards customers and the marketing of products and services to them. This shift from a transactional to a customer relationship approach has emerged as one of the most important components of the overall corporate strategy.

The prior art in the related field can be categorized into the three broad areas of management literature, software solutions and existing business systems in the field of business-to-business Customer Relationship Management. While management literature has, in the recent past, started incorporating the business-to-business perspective in CRM literature more from a conceptual perspective, existing software solutions are not specific enough in terms of the underlying constructs or models used, and conventional methods and systems fail to recognize and address the new challenges of business-to-business CRM as identified by contemporary management literature as summarized herein. Hence, a major part of the description of prior art in the related field draws from extant management research.

One of the primary areas of focus of CRM and research work in the related field, throughout its evolution, has remained that of customer satisfaction. The concept of customer satisfaction and its role in corporate and marketing strategy has been investigated extensively in customer relationship management and service quality literature, including: "Effects of Expectations and Disconfirmation on Post Exposure Product Evaluation" and "A Cognitive Model of the Antecedents and Consequences of Satisfaction Decision" by R. L. Oliver in 1977 and 1980, respectively; "An Investigation into the Determinants of Customer Satisfaction" by G. A. Churchill G. A et al., 1982; and "The Antecedents and Consequences of Customer Satisfaction for Firms" by E. W. Anderson et al., 1993.

A large body of literature is available today on the topic— ranging from varying definitions of the term and varying opinions on its validity as a measure of the health of a relationship, to different statistical approaches of varying complexity used to quantify the measurement of such satisfaction. This literature includes "Measuring and Managing Customer Service in Industrial Firms" by M. Morris et al., 1992; "Improving Service Quality in an Industrial Setting" by S. A. Moore et al., 1994; "Modeling the Determinants of Customer Satisfaction for Business-to-Business Professional Services" by P. G. Patterson et al., 1997; "Customer satisfaction in Industrial Markets—Dimensional and Multiple Role Issues" by C. Homburg et al., 2001; and "Customer Satisfaction Measurement in a Business to Business Context: A Conceptual Framework" by J. Rossomme, 2003. What has remained constant, however, apart from a complete lack of consensus on the utility of the process, is the relative lack of development of the concept as it may apply in a business-to-business scenario.

It is only in the last few years, that a significant amount of management analysis and writing work has been done in the area of the measurement and monitoring of customer satisfaction in business-to-business contexts, including "Customer Satisfaction Measurement in a Business to Business Context: A Conceptual Framework" by J. Rossomme, 2003; "Customer Satisfaction in Industrial Markets; Opening up the Concept" by H. Tikkanen et al., 2000; and "Improving Service Quality in an Industrial Setting" by S. A. Moore et al., 1994. This literature has taken off from where traditional CRM research left, by incorporating the various models of organizational buying behavior that have evolved over time. Where these studies have contributed the most is in the identification of the areas where extant CRM literature fails when applied to customer satisfaction in an organizational buying process. Such contemporary management literature and studies have highlighted the key challenges in applying traditional concepts of customer satisfaction in industrial contexts. These challenges can be summarized in six ways, as follows.

The first challenge includes measuring the level of satisfaction of an entire customer organization for comparison with the level of satisfaction of another customer organization. This differs significantly from traditional CRM analysis that focused on an individual's satisfaction with a specific product/service and the related consumption experience. Current methods and systems are not built in a way that focuses on the measurement and subsequent analysis of satisfaction data as between two or more organizations.

The second challenge is avoiding the limiting assumption of most contemporary research in the field, relating to the use of a 'key informant', or a single contact within the customer organization to provide a comprehensive assessment of organizational satisfaction. Even where some extant literature attempts to propose methods for the measuring organizational customer satisfaction, the assumption that there exists a single source of reliable measures of the health of the relationship health renders the exercise inadequate and its results unreliable.

The third challenge incorporates the contemporary definition of satisfaction as a psychological process indicative of customer 'levels of consumption related fulfillment,' as described by Oliver (1997), which ignores the feedback from key customer organization personnel who are not direct consumers of the vendor organization's products or services. In organizational contexts, as pointed out by Rossomme (2003), this poses two major problems. First, 'many customer employees will not have direct consumption experience to base their judgments on', and second, there is an added dimension of 'concrete, rational objectives' in the determination of satisfaction. This problem of multiple touch points, some of whom might play a decision making role without any direct consumption experience, has not been addressed or incorporated into existing models of customer satisfaction analysis or measurement.

The fourth challenge relates to the realization that given the complexity of buyer-seller relationships, including the number of individuals, levels and multiple interactions involved, a comprehensive independently existing and uniform state of satisfaction does not exist in any organization context. (Tikkanen (2000). As will be elaborated on later, this is all the more relevant in enterprise to enterprise relationships and such limitations of extant methods is a key area that this invention addresses by providing a practical solution. Most existing systems focus around the generation of average measures of satisfaction for the organization, which do not take into account the complexity of 'organizational satisfaction' and 'organizational decision making'.

The fifth challenge is that a lot of managerially relevant contextual information is either concealed, ignored, overlooked or disguised in the form of objective numerical results that are claimed to represent the 'average' level of satisfaction in the customer organization on the one hand and in the total customer base on the other. (Tikkanen et al., 2000). Accordingly, complex relationships, as exist in the business-to-business context, do not lend themselves to standardized rules based on overall average measures of satisfaction. Instead, each relationship is unique and relationship analysis and enhancement actions need to take into account contextual information.

The sixth challenge is to consider that every individual's motivations are driven by his/her individual perceptions, past experiences and personal goals/responsibilities, such that individual assessments of satisfaction will to a large extent depend on the 'individuals' current goals and existing areas of responsibility. (Tikkanen et al., 2000). However, existing systems do not take into account the fact that 'reported' satisfaction is not only a function of the consumption experience but also of the key areas of responsibilities of the informant and his/her immediate concerns and goals.

While the works of research mentioned above and the many others preceding them have covered a substantial amount of ground in understanding the nuances of the organizational buying process and the implications it holds in the measurement of customer satisfaction, there are both added dimensions of complexity and a lack of practical models that can be applied for effective customer relationship management in a business-to-business context. However, given the complexity of organizational relationships and the organizational buying process, there cannot be a practical solution to the superset of business-to-business customer relationship management. Hence, while the model has been developed for an Enterprise Information Technology (IT) Solution vendor-customer relationship, the characteristics and problems remain the same in any business-to-business scenario characterized by a high-involvement, group decision making process, a situation wherein the delivery of the product/service makes up a substantial part of the vendor-customer interaction, a long cycle of engagement including substantial after sales support, and organization wide impact of decisions.

As defined herein, the term "business-to-business relationship" generally refers to a generic business-to-business relationship with the above mentioned characteristics. It will be appreciated, however, that business-to-business relationships, as defined herein, can also extend beyond the Enterprise IT Solutions industry, for which this framework has been specifically developed. In particular, business-to-business relationships can also include large scale infrastructure projects, construction projects, financial services, research and consulting projects etc.

Though the model being described has been developed taking enterprise IT solution industry in mind, similar approaches can also be applied to other business-to-business cases as well with suitable modifications as the fundamental problems for addressing the customer relationship issues are fairly similar across different business-to-business situations.

Apart from the issues in applying traditional concepts of customer satisfaction in industrial contexts as outlined above, the measurement of customer satisfaction from a practical point of view, poses even greater challenges in the context of business to business relationships. Some of these key challenges taking the specific case of an enterprise IT solution vendor-customer relationship are described below.

Initially, there is problem of varying individual expectations within customer organizations, which gets accentuated in the enterprise IT solutions context given the high level of involvement of the customer organization and hence, the wide profile of individuals involved in decision making. For example where the vendor seeks to provide an enterprise solution, such as an Enterprise Resource Planning Solution, the people involved in the decision making process would typically include the CEO of the customer organization, the functional heads, the CIO/CTO and the End-Users. In addition, given the extended service cycle (as a sale cycle would consist of the sales pitch, delivery, implementation, customizations and post-implementation support), which stretches from a few months to a few years, the requirements and expectations of these individual groups tend to vary over that period of time.

The enterprise solutions industry has also failed to provide a standard software solutions package at a standardized price. Instead, each sale or contract has its own unique features, and is to a large extent, never replicated. Thus, there is a high variability in the revenues, both in terms of absolute value as well as in the structure of payments, across customers for what are apparently similar implementations. In such a scenario, it is imperative to be able to arrive at a meaningful method to determine the importance of a customer which should play a deciding role in the allocation of organizational resources to improvement initiatives.

In addition to the above mentioned variability in expectations arising from the varying needs and responsibilities of individual respondents within the customer organization, another factor that plays an important role in determining the reliability of satisfaction measures in the present context is the long engagement cycle. For example, the sale of non-packaged software products are invariably accompanied by consulting services, implementation and post-implementation support services. The complete cycle of activities could last for a period varying from a few months to a few years. Given this fact, the reported scores of satisfaction tend to be determined to a large extent by events in the immediate past thus making these measures more volatile and less reliable as measures of overall satisfaction. Therefore, to be able to arrive at reliable scores of satisfaction, both at the individual and organizational level, such volatility (arising out of recent events) needs to be identified and neutralized.

The end results that a vendor organization expects to achieve by focusing on customer relationships and customer satisfaction include an enhanced lifetime value of the customer through retention of customers, revenue growth through cross-selling opportunities as well as successful referencing to prospects for generating new business. However studies in the Business to Consumer space have shown that the link from customer satisfaction to modified vendor behavior and eventually greater vendor profitability is weak and statistically insignificant, as described in "The Mismanagement of Customer Loyalty" by W. Reinartz et al. in the Harvard Business Review (2002).

Accordingly, given the complex process of purchase decisions in business-to-business transactions such as enterprise information technology solutions and the multifarious factors leading to customer profitability, an exercise seeking to compute the statistical correlation between customer satisfaction and profitability might not be rigorously accurate or precise. However, from a practical and business oriented point of view the determination and assigning of a meaningful value to the customer relationship having two dimensions i.e., customer satisfaction and customer importance would enable the vendor to optimally allocate its resources, which in turn is likely to be one of the important factors for increasing the overall profitability of the vendor.

There is considerable literature that has documented the problems faced in industrial settings in the practical applicability of Customer Satisfaction Studies in affecting any parameters of business performance. The main, problem with the existing approaches to the measurement and monitoring of satisfaction, however, is that it is almost impossible to keep an entire organization motivated by a notion as intangible as customer satisfaction. Therefore, customer satisfaction must be translated into a number of measurable parameters and definite actionable inferences that vendor employees can understand and utilize in customer relationship enhancement.

Accordingly, in view of the foregoing, it is apparent that the existing prior art fails to provide any practical system or method for the evaluation of customer relationships and for the allocation of resources based on the same in a business-to-business context. Therefore, there is a need for improved systems methods and computer program products that can address the special needs of customer relationship management and enhancement in an enterprise IT solution vendor customer relationship. This is particularly true when considering special needs such as the differing expectations of key contact points in the customer organization, the effect of long life cycle interactions and its impact on individual and organizational expectations, the contextual information needed to support, supplement and make more meaningful and practically useful, any analyses of the state of the relationship, the need for 'iterative' if not 'real time' feedback to eliminate 'recent episode' bias, time-cycle based needs and need shifts, and the link from customer satisfaction to customer value enhancement taking into consideration relative customer importance and the need for the optimization of vendor resource allocation.

There is also a need for a method for measuring and monitoring customer satisfaction in the enterprise solutions industry that focuses on the extracting relevant and useful areas of improvement that the organization can focus its resources on, which would also incorporate the value of the customer to the firm while prioritizing action areas.

BRIEF SUMMARY OF THE INVENTION

This invention has been devised to address many, if not all, of the foregoing inadequacies, limitations, disadvantages and problems related to traditional approaches to the measurement and monitoring of customer satisfaction in business-to-business contexts and the above mentioned challenges highlighted by contemporary research.

Accordingly, one embodiment, the present invention provides a practical, easy to implement system and method for evaluating and enhancing the health of customer relationship in a business-to-business environment after taking due cognizance of the vendor's resource constraints.

The present invention also provides a practical method for enhancing customer relationships. In particular, embodiments of the invention present methods and systems for the evaluation of customer relationships in business-to-business contexts, leading to an optimum allocation of resources and directed towards the overall improvement in the health of the vendor organizations' relationships with its organizational customers. As mentioned earlier, although the framework, constituent methods, models and computer program products that are described herein are specifically designed for an enterprise IT solutions context, they are also applicable in similar business-to-business relationships, as should be appreciated by those skilled in the art.

The present invention, as described herein, provides novel approaches to customer relationship management and more specifically, models that can be applied to the measurement, monitoring and enhancement of customer relationships in business-to-business relationships and that can also be used for generating data and actionable inferences in the customer relationship context. While the invention has been conceived of and incubated in an enterprise software solution organization, the applicability of the model can be extended to any business-to-business setting with similar characteristics.

One inventive concept described herein includes a method for capturing key satisfaction related information from key customer touch-points. The said inventive method includes a categorization of respondent profiles from within the customer organization that are representative of the key influence groups in the overall decision making process. Actual data that helps arrive at measures of Customer Satisfaction is collected through two main channels—the internal channel comprising the key internal customer contacts (also referred to herein as "boundary employees") and the external channel consisting of representatives from each of the identified respondent profile groups. This novel dual approach to arriving at satisfaction figures helps establish a reliability of the scores, by reducing subjective biases, and isolates those cases where the differences are indicative of some recent event in the relationship (as is the cause in most cases observed) which are taken up for immediate action to counter the effect of that recent event.

The inventive method also incorporates the added dimension of Customer Importance in the overall analysis and interpretation of customer satisfaction. This is done through an internal assessment on various parameters to arrive at a final Importance Score for each organizational customer. This enables efficient resource utilization in maintaining and improving satisfaction scores and the relationship in general. Given the variability of revenues in the industry, as explained above, in the background section, this adds an important and sometimes necessary dimension to the inventive model.

Finally, by incorporating all three scores, namely, (1) the internally reported customer satisfaction, (2) the externally obtained satisfaction figures and (3) the customer importance scores, the inventive method provides a framework for the analysis of various relationships by generating measures of relationship health on key parameters of performance. This in turn can help to identify relationships that are in critical need of attention, isolate critical areas of improvement, and to identify trends across various respondent profiles and life-cycle phases in a manner that optimizes the use of vendor organizational resources.

Accordingly, as described herein, the present invention provides a decision-aiding framework for customer relationship enhancement. The present invention also enhances the ability to make short term and long-term decisions in the area of customer relationship management. For example, stark differences between the internally reported customer satisfaction measure and the externally obtained satisfaction measure highlight the need for urgent corrective action to remedy, for instance, any recent episode bias.

In another aspect, the present invention provides an additional dimension of customer importance and, for example, the estimation of values for such importance as an important tool for vendor management's decision making. For example, such additional dimension facilitates the allocation of resources by vendor management, impacting profitability in two ways. Firstly reducing unnecessary costs and secondly improving yield on resources deployed.

Embodiments of the invention also enable cost sensitive decision-making capabilities. For instance, the invention can highlight customer relationships that merit either greater or lesser attention based on present and anticipated value to the vendor, helping prioritize vendor resources.

Drawing from the above, optimum allocation of resources based on the invention, can help develop a customer centric vendor organization, both as to structural aspects (organizational design) and as to attitudinal aspects (customer orientation).

According to yet another aspect, embodiments of the invention enable the generation and analysis of contextual information to support, supplement and make more meaningful for management decision making process. For example, satisfaction measures would tend to be more volatile during the implementation phase of the enterprise solutions than say during the post-implementation support phase, where the satisfaction tends to stabilize and approach a more true representation of organizational satisfaction.

Drawing from the above, addresses the need to measure the level of satisfaction of an entire organization as represented by a broad spectrum of respondents selected on the basis of the special needs of each situation Through implementation of certain embodiments the invention, it is possible to more or less neutralize the drawbacks of relying solely upon respondents who have "consumption related fulfillment" and draws upon, additionally, key decision makers and strategic personnel in the customer organization who may not have direct "consumption related" experience. For example, while most of the consumption experience in an enterprise solution implementation would be with the project team from the customer organization, decision making on such projects will be a group exercise involving the top management, functional heads and end users from the organization. Hence, satisfaction of these personnel is an important component of the overall measure of satisfaction.

The invention also imparts reliability and strength to the findings arising therefrom, because the present method does not end with the generation of "average measures" but rather, uses these measures along with feedback and value estimations to generate targeted action plans.

In certain embodiments, the invention permits and facilitates the factoring in of the goals, concerns and responsibilities of the customer organization and key respondents thereby relating findings and conclusions to business imperatives and direction. For example, the invention suggests the usage of weighted averages in the calculation of organizational satisfaction scores, based on the profile of respondents included in the survey and the lifecycle phase of the relationship.

The invention can also facilitate the development and application of "If-Then" rules for narrowing the focus of vendor management on key issues and broadening the scope of attention available to key issues which merit escalation to top management. For example, based on satisfaction and importance baseline measures, the invention presents rules for the classification of customers to enable a prioritization of vendor resources for corrective action.

According to another aspect, the invention addresses the need for and facilitates repetitive and iterative data generation and analyses in the context of long sales cycles and varying expectations at different stages of the life cycle even among the same set of respondents. In another embodiment, this includes selection and variation of such customer organization respondents in the light of the relevant phase of the sales cycle. For example, during the implementation phase of the relationship lifecycle, reported satisfaction of implementation team members and end users will be more representative of immediate operational issues in the project, while that of the CEO or top management would tend to be reflective of the general opinion of the progress of the project in it's broader and more strategic aspects.

Another benefit of the invention is enabling the training of customer facing vendor personnel and support personnel in customer relationship management and enhancement. In particular, analysis of the parameters for customer satisfaction can lead to assessment of the skill level of the customer facing vendor personnel as perceived by the customer and identification of areas where suitable training need to be undertaken.

Along similar lines, the invention can help building awareness of the vital importance of customer satisfaction measurement, monitoring and enhancement through the entire vendor organization. The concept of customer satisfaction translated into a number of measurable parameters and definite actionable inferences that vendor employees can understand and utilize in customer relationship enhancement can help the organization focused towards achieving the customer satisfaction goals.

According to yet another benefit, embodiments of the invention can help provide rigorous and detailed diagnostic analyses of vendor customer relationships and the identifications of strengths, weaknesses, threats and opportunities both at a strategic level as well as operational/transaction level. While the present invention analyzes the status of the relationship between the vendor and individual customers at transaction/operational level, the aggregation of all the customers provides direction for the customer relationship management at a strategic level.

With its novel features, the present invention provides superior data and techniques for decision-making by vendor managements in the context of business-to-business customer relationship management and enhancement, as compared with conventional methods and systems.

These and other objects and advantages of the present invention will become apparent from the following detailed description and accompanying drawings and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
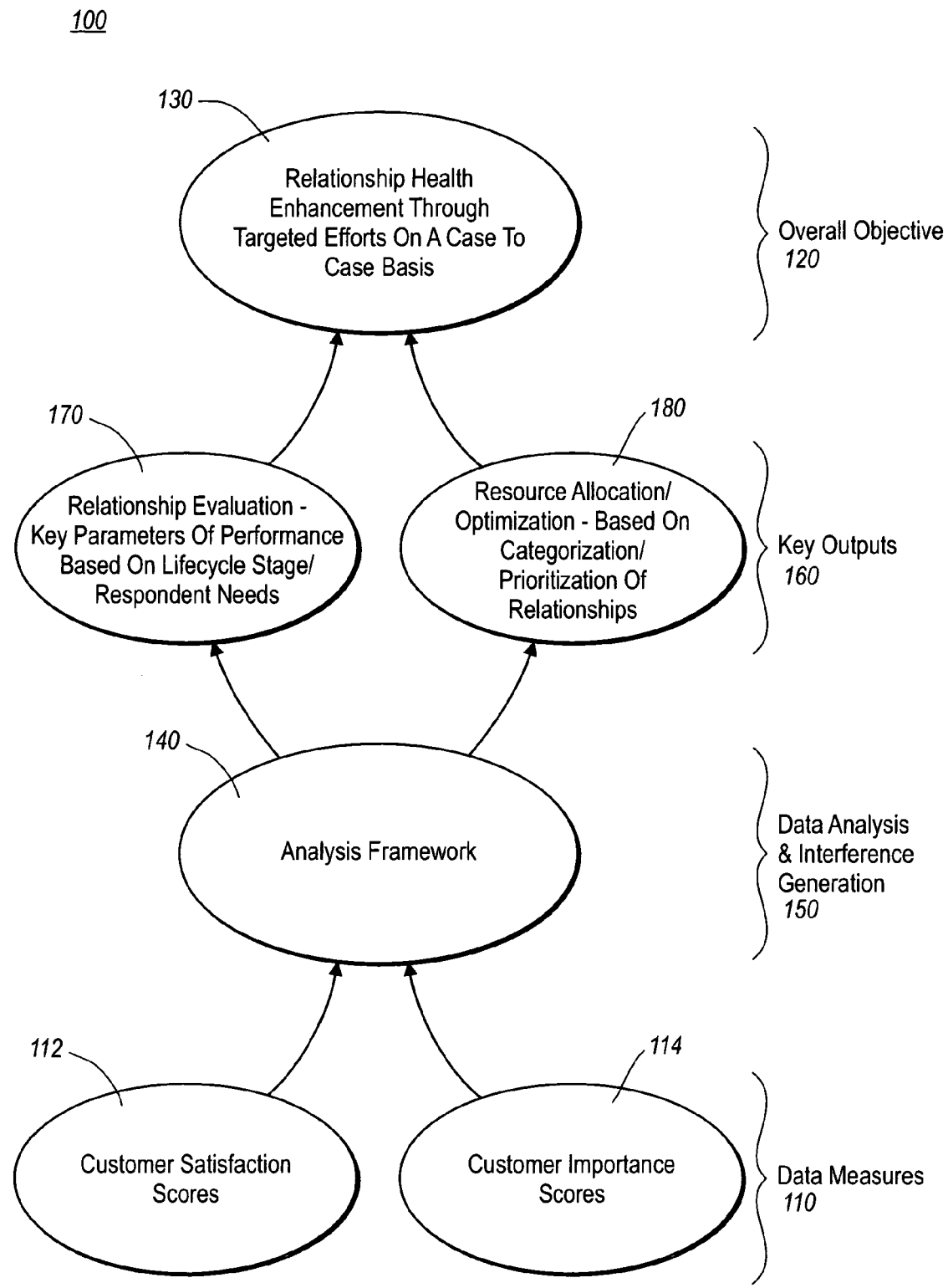
FIG. 1 illustrates the architectural framework for the evaluation and enhancement of customer relationships in an enterprise solution provider context.

FIG. 1 illustrates an architectural framework 100 consisting of two key data measures 110, Customer Satisfaction Scores 112 and Customer Importance Scores 114, which can be used to provide a benefit or overall objective 120 of enhanced relationship health through targeted efforts on a case to case basis 130. These scores are fed into the analysis framework 140 to generate actionable inferences, through data analysis and interference generation 150. The framework also includes the generation of key outputs 160 such as relationship evaluation 170 and resource allocation/optimization 180, based on the evaluation of the relationship across aggregate scores of satisfaction and on a prioritization of the importance of the relationship to the vendor organization.

The first data measure on which the framework is based, the Customer Satisfaction Score 112, represents the quantitative scores of customer satisfaction on various parameters of a relationship including, but not limited to; operational parameters like product/service fitment, maintenance of schedules, quality of products/services; behavioral parameters like the customer's payment record, repurchase intention; strategic parameters like the customer's dependence on the vendor, quality and frequency of interactions; and specific product/service attributes. The measurement of these satisfaction indices or parameters can be conducted in any way found suitable and typically includes the designing and administering of questionnaire based surveys.

According to one embodiment, the scores measuring satisfaction of the various parameters are measured using a dual approach. In particular, the measurement of these scores includes an external measure comprising selected respondents covering various roles within the customer organization report their satisfaction on these parameters through a survey; and an internal measure comprising the reporting of relationship health by boundary employees of the vendor organization, which as described above, are the key internal customer contacts.

Complementing the Customer Satisfaction Score 112 is the Customer Importance Score 114, an internally measured, quantitative score of the importance of the customer to the vendor organization arrived at using an analysis of various strategic and financial aspects of the relationship. The analysis framework utilizes these three measures, namely, the internally reported satisfaction, the externally reported satisfaction, and the customer importance to generate various levels of actionable inferences.

A first inference is a categorization of relationships into one of four categories comprising Desired, Critical, Comfort, and Transition, thereby enabling a prioritization of relationships to be taken up for analysis.

Another inference is the identification of key drivers of satisfaction across various categories of customers (for example across all Critical relationships) based on respondent profiles and lifecycle phases.

Yet another inference is the identification of chronic problem areas for the vendor organization which need to be analyzed and improved.

Figure 2:
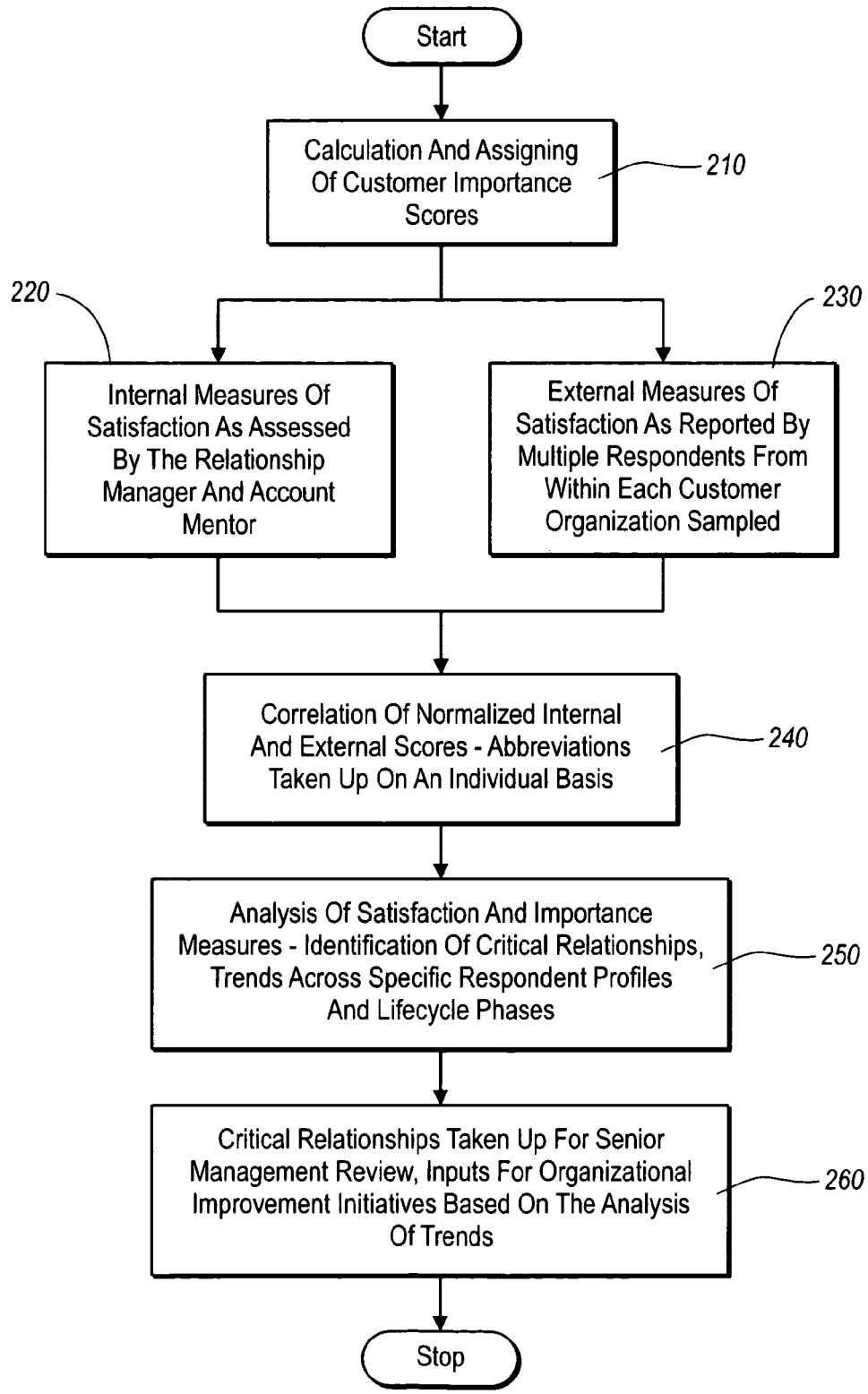
FIG. 2 illustrates the overall process flow of the framework.

FIG. 2, illustrates a flowchart 200 of one embodiment of a method of the present invention for evaluating and enhancing relationship health. As shown, the method includes acts or process flow of activities performed under the architectural framework 100 illustrated in FIG. 1. In particular, the method 200 includes calculating and assigning customer importance scores (210), obtaining internal (220) and external (230) measures of satisfaction, correlating normalized internal and external scores (240), performing analysis of satisfaction and importance measures (250), and taking up critical relationships for review and obtaining inputs for organizational improvement initiatives based on the forgoing analysis (260). Each of the individual components of the data measures, analyses models and outputs will be described in more detail below.

Customer Satisfaction

Figure 3:
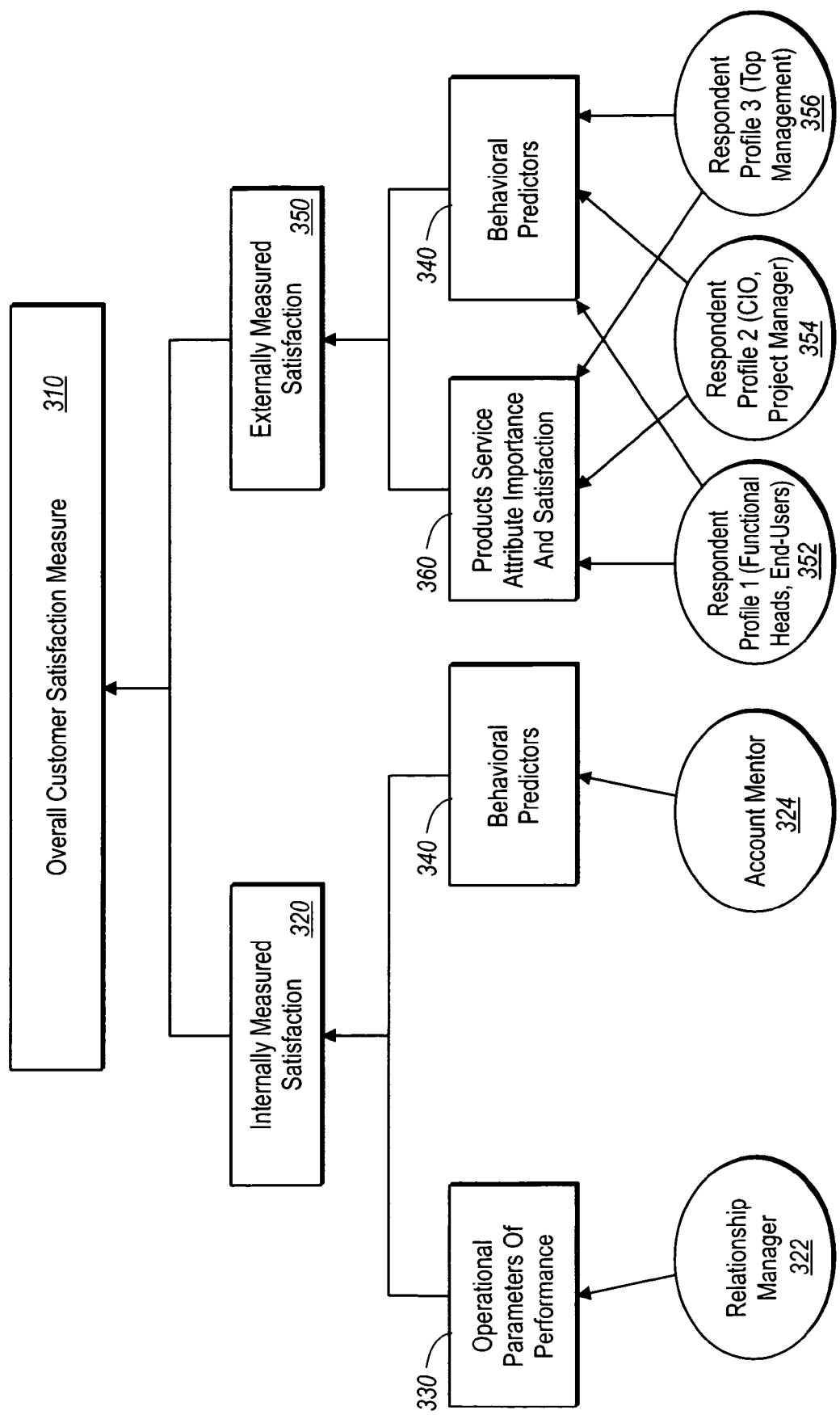
FIG. 3 illustrates the various drivers of customer satisfaction in terms of their broad categories and the sources for the same in context to the two pronged approach to the measurement of satisfaction.

As mentioned above, the invention presents a two pronged approach to the measurement of customer satisfaction. As shown in FIG. 3, there are multiple parameters from multiple sources that contribute to the overall satisfaction measure 310.

Internal measures of satisfaction 320 obtained from the key customer touch points from within the organization (i.e., the Relationship Manager 322 and Account Mentor 324). These measures of satisfaction are derived from the assessment of the vendor touch-points on the customer perception of two broad parameters.

Operational measures of performance 330 includes such things as the data collected on organizational performance in the delivery of the product/service or support, such as the lifecycle stage might be. As an example, in an enterprise IT solution vendor perspective, such measures would usually include—product/solution fit to client requirements, adherence to implementation schedule, number of errors reported during the User Acceptance Test, etc.

Behavioral predictors as measures of satisfaction 340 includes such things as the data collected on customer satisfaction as derived from reported indicators of future behavior of the customer on tangible parameters of importance to the organization.

Illustratively, such measures would include assessments of the customers' willingness and potential to participate in media and prospect referencing, expected investment from the customer in related products/services, etc.

External measures of satisfaction 350 obtained from key respondents within the customer organization 352, 354, 356. These satisfaction measures are derived from customer reported satisfaction with their past experiences on identified attributes of the products service attribute importance and satisfaction 360 and the customers' opinion on the behavioral parameters 340. However, there could be certain differences in choice of parameters for a particular category between the internal and external assessment of satisfaction. For example while 'Payment Record' is an important behavioral parameter for internal assessment, the same is not used for external assessment of satisfaction.

The typical factors used in the system's present form are shown in Table 1, below.

TABLE 1

| Operational Parameters | |
|---|---|
| Corporate Image | Product/Solution fitment |
| Pre-Sales/Sales Process | Product Implementation |
| Adherence to the schedule | Product Performance |
| Quality of Product/Solution | Post-implementation support |
| Return on investment (ROI) with respect to client's investment in vendor's products & services | Client's degree of comfort & dependence with vendor |
| Frequency & quality of interaction | Client's perceived advantage of working with products/services from vendor as compared to competition |
| Behavioral Parameters | |
| Willingness to talk to media | Payment Record in terms of timely payment |
| Willingness to act as reference site | Repurchase intention |
| Willingness towards speaking to media | |

While the invention does not specify any fixed method to be adopted in the measurement and calculation of the above mentioned individual customer satisfaction measures, it does recommend that the factors incorporated in arriving at a final score for satisfaction be based on the stated purpose of each measure. The more pertinent requirement that this invention lays down is that of a consistency in the approach and methods used to arrive at the satisfaction figures.

Figure 4:
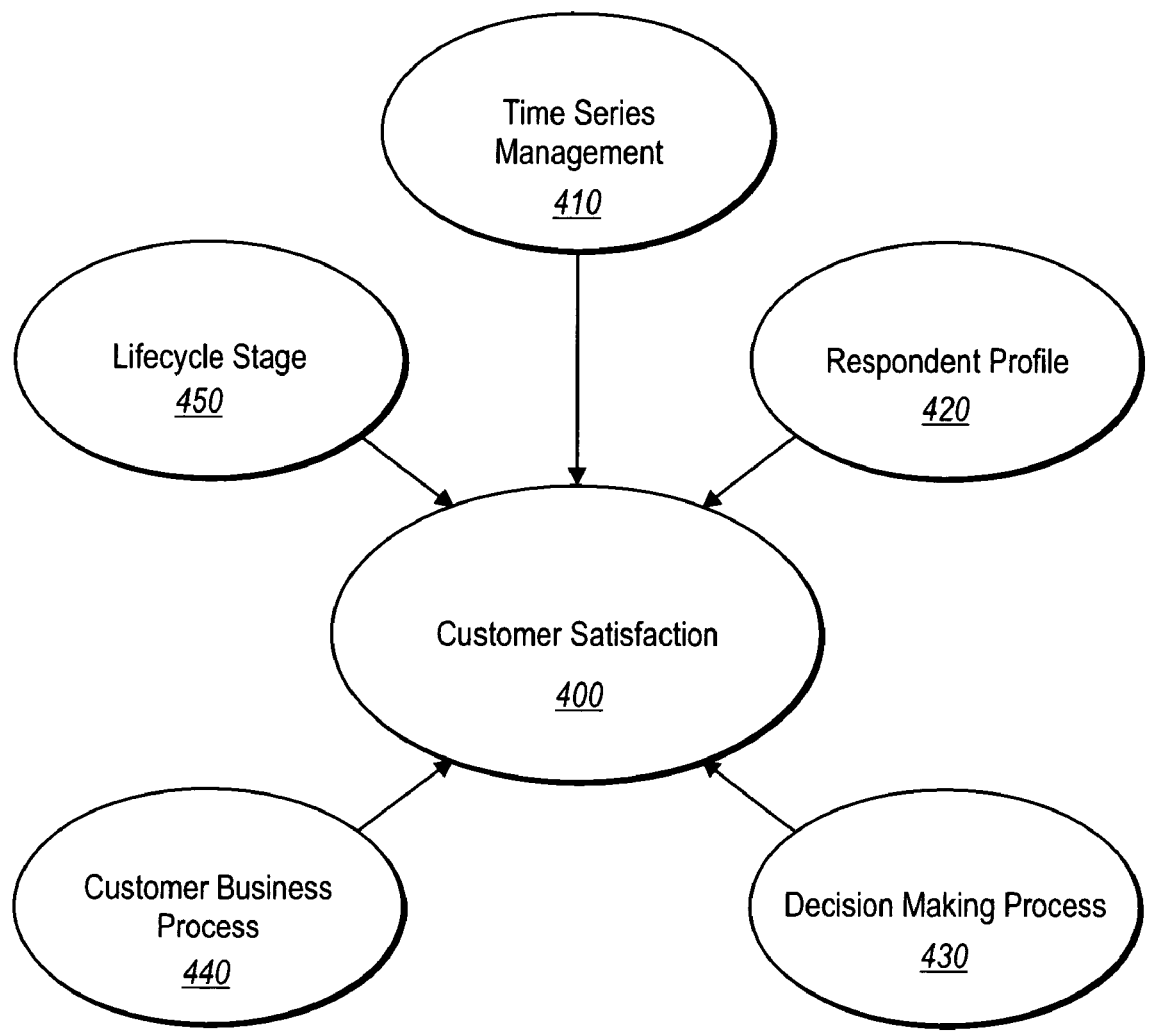
FIG. 4 illustrates the contextual information that is required to be coupled with quantitative satisfaction measures for better insights into customer relationships and consequently, a more focused approach to their improvement.

Another key aspect of the measurement of customer satisfaction as laid down by this invention is context. As mentioned previously, any measure of customer satisfaction has to be linked with contextual information for any meaningful analysis and action to be based on it. FIG. 4 shows some of the broad categories of contextual information that are associated with the satisfaction score 400 of a customer organization, and which can be of significance to the subsequent analysis of such data. These categories can include, for example, such things as time series management 410, respondent profiles 420, decision making processes 430, customer business processes 440, and lifecycle stages 450, as described herein.

Satisfaction Surveys consisting of questionnaires administered (over various channels) are the most common and cost-effective way of collecting data on customer satisfaction, although other techniques can also be used. Surveys, though prone to a number of problems that add to the collective doubt on the efficacy of the instrument, still are the backbone of almost all of the satisfaction studies that are conducted across the world. A relatively large amount of literature exists covering various aspects of the designing and administering of these surveys. However, while designing the methodology for measuring the stated parameters of satisfaction, care should be taken that similar parameters are considered for measuring similar constructs in both the internal and external surveys. A multi-criteria satisfaction model based on preference disaggregation could be used for this, such as, but not limited to the multi-criteria satisfaction model described by Y. Siskos et al. in the article entitled "Measuring Customer Satisfaction Using a Collective Preference Disaggregation Model" (1998).

The preference disaggregation methodology is an ordinal regression based approach in the field of multi-criteria analysis. According to this model, the Relationship Manager, Account Mentor and customers are asked to express their score on global measures of satisfaction as well as satisfaction with regard to a set of discrete criteria. The collected data is analyzed with the preference disaggregation model, taking into account the ordinal and qualitative aspects of the customer's judgments and preferences. The parameters for measuring satisfaction, as shown in FIG. 3 and elaborated above, will contain both operational as well as behavioral measures and the cumulative weightages of the operational measures should not exceed that of the behavioral measures.

Irrespective of the method chosen to arrive at the individual satisfaction figures, the following satisfaction scores are generated for every customer.

CSI (RM)—Satisfaction Index as derived from Relationship Manager Scores.

CSI (AM)—Satisfaction Index as derived from Account Mentor Scores.

CSI (PROFILE 1), CSI (PROFILE 2), . . . , CSI (PROFILE n)—Satisfaction Indices as derived from the satisfaction data of each individual respondent group within the customer organization.

Overall averages are calculated for both Internal (CSI (INT)) as well as External (CSI(EXT)) measures.

$$CSI(\text{INT}) = \frac{w(1) * CSI(RM) + w(2) * CSI(AM)}{w(1) + w(2)}$$

$$CSI(\text{EXT}) = \frac{\sum w(n) * CSI(\text{PROFILE}n)}{\sum w(n)}$$

These scores are calculated for individual customers and normalized. For cases where there are significant differences between the CSI(INT) and CSI(EXT) scores, subsequent and isolated individual analysis can be performed. The main advantage of this process is that, more often than not, these differences are indicative of specific incidents or events in the relationship that have occurred in the recent past. These incidents serve as the immediate cause for a downward or upward movement in the customers' perceptions of their satisfaction with the supplier. Taking these cases up on an individual basis helps organizations nip potential downfalls in satisfaction in the bud by addressing those problems that are the most recent and with a specific individual or respondent group. Addressing these problems immediately prevents them from getting escalated within the customer organization and becoming a part of their corporate memory. Also a causal analysis of such incidents to significant upward/downward movement of customer perception would lead to identification of such important incidents having critical influence on customer satisfaction.

Customer Importance

As mentioned earlier, a second pillar of this invention is the use of customer importance scores in any analysis of satisfaction measures. This score helps in the prioritization of relationships and the subsequent optimal allotment of organizational resources to the identified factors influencing the relationship.

Figure 5:
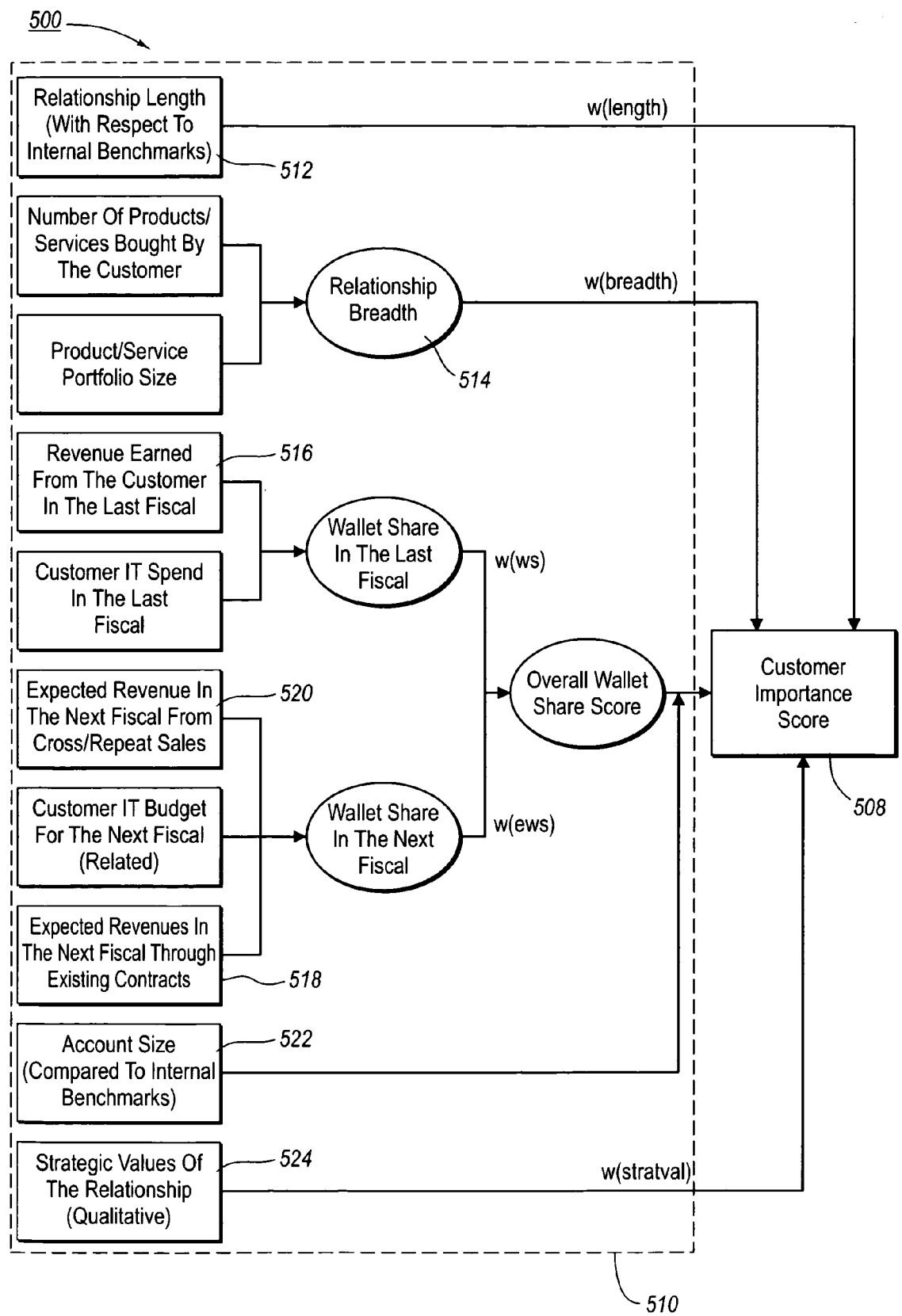
FIG. 5 illustrates the various components of Customer Importance, their estimation and aggregation using a simple weighted average method to arrive at an overall importance score.

There are various parameters that can be used in assessing the importance of a customer, as reflected in FIG. 5. Some of these parameters 500 include the following:

Length of the Relationship (512) (length)—A measure of the length of the organization's relationship with the customer organization with respect to internal benchmarks (hence measured on a 5 point scale).

Breadth of the Relationship (514) (Breadth)—Measure of the number of products/services that have been used/are in use by the customer Revenue earned from the customer in the last fiscal (516) (REV[t]).

Expected Revenues in the next fiscal through existing contracts (518) (REV[t+1]).

Expected Revenues in the next fiscal through cross/repeat sales (520) (REV[Cross]).

Overall size of the account as measured against internal benchmarks (522) (measured on a 5 point rating scale).

Internal assessment of the strategic value of the relationship to the organization (524) (could be in terms of media presence, reference-ability, strategic position in its market etc.) measured on a 5 point rating scale These measurable variables are combined to arrive at an overall customer importance score 520 as shown in FIG. 5.

Customer Importance is then measured as

CUST.IMP.=[$w$(length)*LENGTH+
$w$(breadth)*BREADTH+SIZE*[$w$(ws)*
WALLET($t$)+$w$(ews)*WALLET(t+1)]+
$w$(stratval)*STRATVAL]*100

Where, $$LENGTH = \frac{length\ (rating)}{Max\ Rating\ (5)}$$

$$BREADTH = \frac{Number\ of\ distinct\ products/services\ in\ use\ by\ the\ customer}{Portfolio\ size\ of\ products/services}$$

WALLET(t)=(Rev[t])/Related IT expenditure by customer in the last fiscal $$WALLET(t+1) = \frac{Rev[t+1] + \beta * Rev[Cross]}{Proposed\ IT\ budget\ (related)\ for\ the\ next\ fiscal}$$

Where β is the probability (or risk factor) associated with the estimated Cross Sales revenue. This could be determined as an organizational average or based on geographies or any other factor that best determines the probability of the estimated revenues being realized, wherein:

SIZE=Account Size Rating/Max Rating (5)
STRATVAL=Strategic Value Rating/Max Rating (5)

Some of the values that are used in the formulas and calculations described above are defined as follows:

w(length) is the weight assigned to Relationship Length in the overall score.

w(breadth) is the weight assigned to Relationship Breadth in the overall score.

w(ws) is the weight assigned to WALLET(t) in the overall score.

w(ews) is the weight assigned to WALLET(t+1) in the overall score.

w(stratval) is the weight assigned to Strategic Value in the overall score.

While the determination of the individual weights is an organizational decision, one set of values that have worked reasonably well in trial includes the following:

w(length)=0.1
w(breadth)=0.2
w(ws)=0.3
w(ews)=0.2
w(stratval)=0.2

According to one embodiment, a condition that needs to be satisfied in determining the weights is the following:

$$w(length)+w(breadth)+w(ws)+w(ews)+w(stratval)=1$$

To summarize, the scores that are available for each customer as part of the analysis framework described above, include the following:

(1) CUSTOMER SATISFACTION, based upon the following:
CSI (RM)
CSI (AM)
CSI (PROFILE 1), CSI (PROFILE 2), ..., CSI (PROFILE n)
CSI(INT)—Consolidated Internal Score
CSI(EXT)—Consolidated External Score; and
(2) CUSTOMER IMPORTANCE Each of the forgoing scores are specific to an individual customer and in the case of CSI(PROFILE n) to an individual respondent group. These scores are also specific to a particular phase of the Relationship Lifecycle.

As mentioned earlier, prior to the actual analysis of the scores, the normalized scores of CSI(INT) and CSI(EXT) are compared. Cases where the difference between the two is significant are taken up for investigation through a series of internal as well as external discussions. Reasons for the difference are explored through a tracking of all Events that have occurred in the course of the relationship and more specifically since the last assessment period. These events are tracked at all the three levels of context—the inner context, the connected network and the outer context of the connected network. This has been found to be a very efficient method, though time consuming, and entirely infeasible to conduct across the entire customer base. Filtering those cases out where there is a strong indication of significant changes in the immediate past helps improve the overall efficacy of the analysis and allow corrective actions to be taken before the problem gets embedded in the customer organizations memory.

Figure 6:
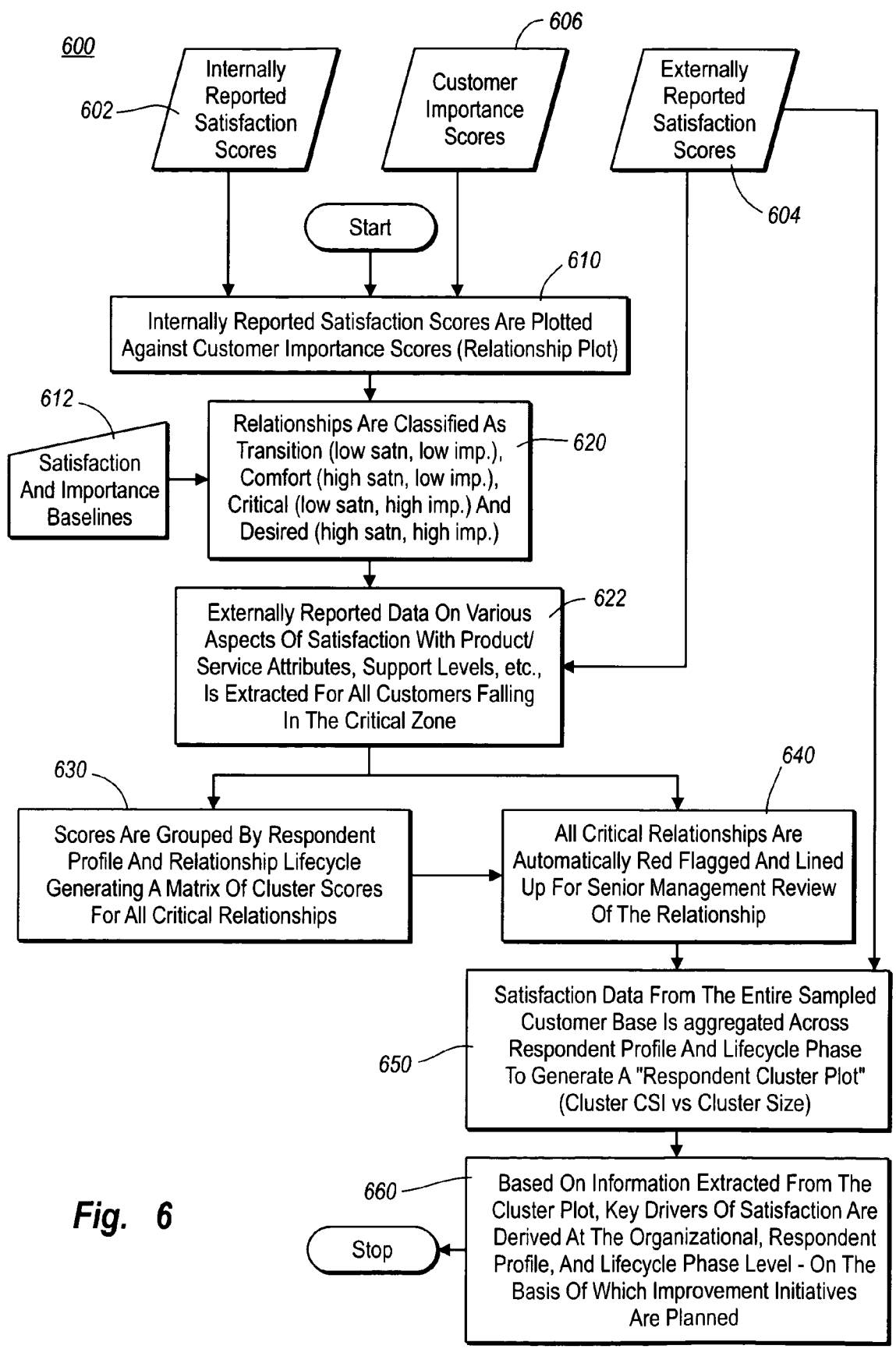
FIG. 6 illustrates the process flow of the Analysis Framework.

The analysis framework proposed by this invention is a multi-stage process or method 600 shown in the flowchart in FIG. 6. In the embodiment shown, the method described by the analysis framework includes gathering the internal and external satisfaction scores 602 and 604, as well as the customer importance scores 606. It will be noted, however, that in some embodiments, the external satisfaction scores 604 are only gathered (622) for customers that are classified (620) as critical, as described below. The internal satisfaction score 602 and the customer importance score 606 are first plotted into a relationship plot (610), which essentially comprises a consolidated map of the entire customer base.

Figure 7:
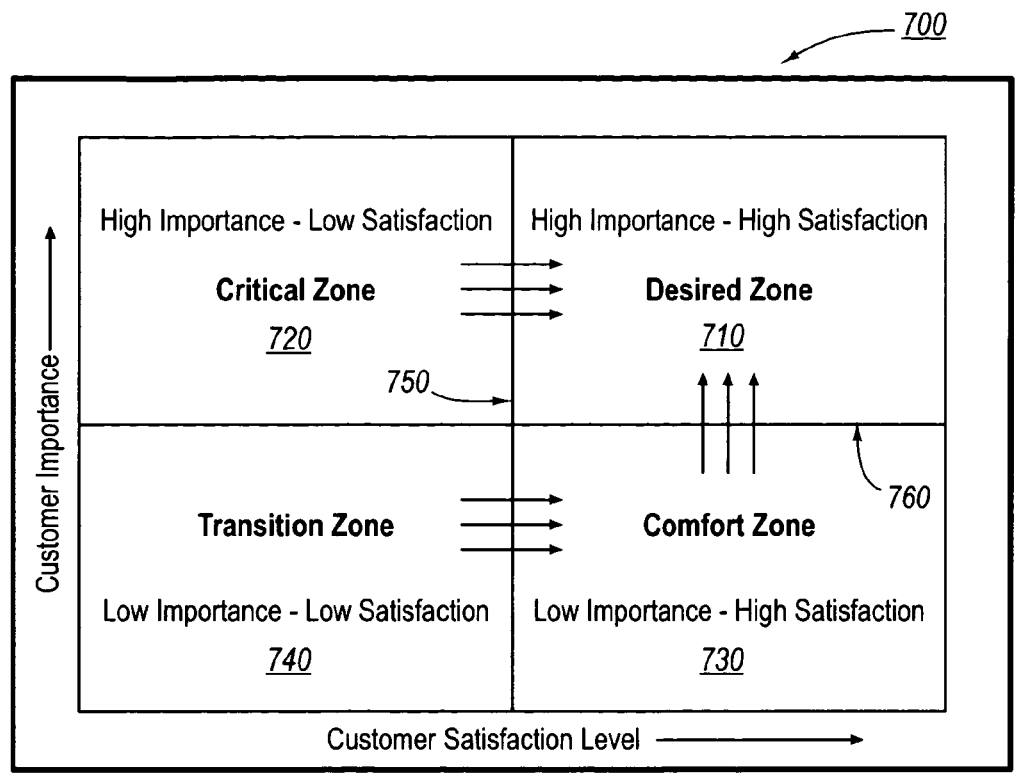
FIG. 7 illustrates the Relationship Plot, which is used in the categorization and prioritization of relationships on the basis of their satisfaction and importance scores.

The relationship plot 700, which is shown in FIG. 7, can also include satisfaction and importance baselines that have been established (612) to enable classification of the relationships (620) into one of four quadrants, as described in more detail below. As mentioned above, the external satisfaction scores 604 are then gathered (622) for customers that are classified (620) as critical. Scores are then grouped by respondent profile and relationship lifecycle to generate a matrix of cluster scores (630), as described in more detail below. The critical relationships are then flagged (640) for subsequent review, including respondent cluster plotting (650), which can include additional consideration of the externally reported satisfaction scores 602. Finally, key drivers of satisfaction are derived (660), from which improvement initiative can be based to help mend or enhance the corresponding relationships. It will be appreciated that while some of the mentioned activities or acts can be conducted in parallel, they can also be conducted in series. It will also be appreciated that the overall flow of activities, as shown in FIG. 6, can also be modified to include additional acts or to eliminate certain acts, as necessary, to accommodate different needs and preferences.

Figure 8:
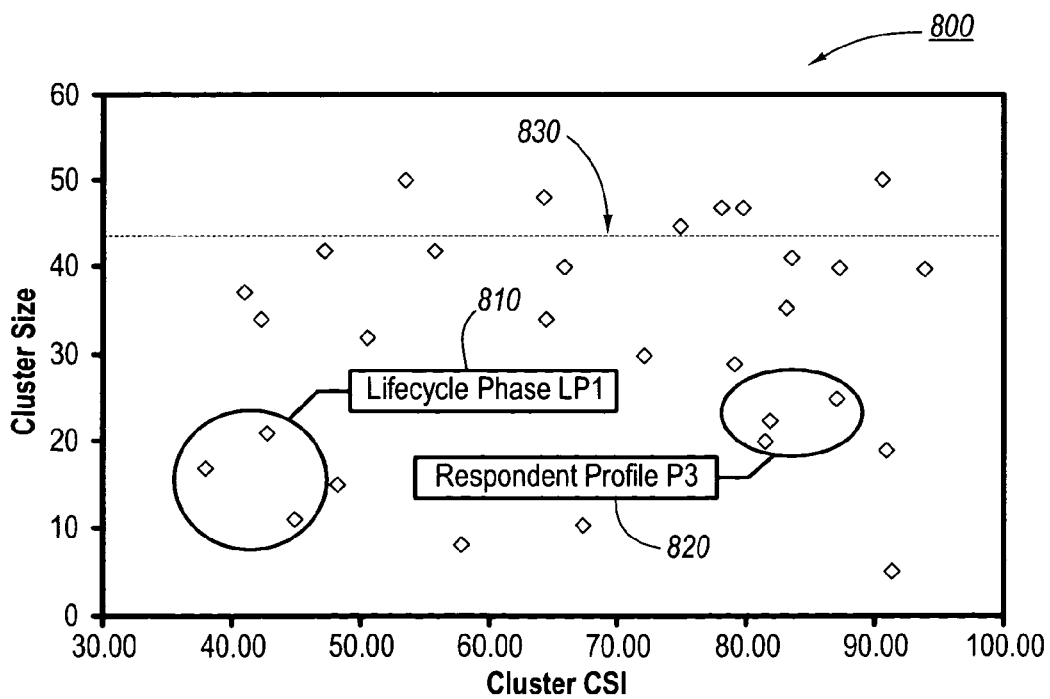
FIG. 8 illustrates the Respondent Cluster Plot, a means to identify trends and chronic problem areas across all respondent clusters formed on the basis of the lifecycle stage of the customer and the respondent profile.

A more detailed explanation of some of the acts shown in FIG. 6 will now be provided with reference also being made to the relationship chart 700 of FIG. 7 and the respondent cluster plot 800 of FIG. 8. Initially, as mentioned above, the first stage of analysis is the generation of a consolidated map of the entire customer base. This map is generated using internal satisfaction measures 602 i.e., CSI(INT). Some reasons for using the internal measures include the following: (1) Internal Satisfaction measures capture the predicted behavior of the customer from the boundary employees. External measures on the other hand are based on customer perceptions of satisfaction with past experiences and are not reliable indicators of future behavior (both in general and more specifically in the enterprise solutions industry). (2) These boundary employees are those people who are in constant touch with the customer and have been associated with them from the initiation of the relationship. (3) These assessments are also, indirectly, statements of the targets of the employees (RMs, and AMs). Given the balancing act between presenting aggressive targets and under-achieving, such measures tend to be reasonably valid. In those cases where individual biases might creep in, obtaining measures from multiple sources helps correlating the scores and negating the bias.

As shown in FIG. 7, the internally measured satisfaction scores are plotted against the Importance Scores to generate an overall map 700 of the health of all relationships. As shown, all relationships are classified into one of the four quadrants described below.

The DESIRED ZONE 710 corresponds to relationships showing a high level of both satisfaction and importance. These are the relationships that are the lifeline of the organization. Service levels need to be maintained and these organizations need to be looked at closely to identify and capture any opportunities for the cross-selling of products or services.

The CRITICAL ZONE 720 corresponds to relationships that are high on importance and low on satisfaction. These relationships are considered in the red and need to immediate attention of the management. These are 'Important' customers who need to be kept satisfied. Given their importance, these customers will also have a significant size and reputation in their markets. Their implementation of an enterprise solution package will tend to be well documented in the media. Such relationships have the potential to snowball into nightmares in an industry where competition is tough, media unrelenting, and where word-of-mouth plays a huge role in purchase decisions.

The COMFORT ZONE 730 corresponds to relationships that are low on importance and high on satisfaction. These are the relationships that don't need any immediate action but need to be monitored as their growth and consequently their account size with the supplier has tremendous upside. Developmental opportunities need to be found with these customers and the relationships need to be maintained.

The TRANSITION ZONE 740 corresponds to relationships that are low on both importance and satisfaction. These relationships tend to be either in the embryonic stage or in the dying stages in the perspective of the supplier. Till further movement is observed, or some incident triggers review, these are the relationships that are to be primarily monitored. However, suitable action plan needs to be worked out to move the relationships which are not in the dying stage to the comfort zone.

The dividing lines 750 and 760 in the above plot or the satisfaction and importance baselines are predominantly a matter of the benchmarks that the organization wishes to set for itself. The calculation of the levels of importance and satisfaction would also depend on the overall stance that an organization wishes to take in terms of its customer relationships—an aggressive outlook would imply a high benchmark for satisfaction and a lower benchmark for importance. The choice however has to be determined based on the resources that the organization has at its disposal in the monitoring and managing of its relationships.

Based on this overall stance, benchmarks should be set on the individual parameters of customer importance. Using these individual figures, an overall importance baseline is calculated in the same fashion as outlined above and this serves as the primary reference for the setting of the importance baseline. In the case of the satisfaction baseline, it is a more subjective decision and the suggested method is to use a reasonable sample of past data to assess the overall spread of customers and also to incorporate any industry benchmarks that might exist.

The next stage of analysis is that of all customers who fall into the CRITICAL ZONE 720 or quadrant as shown in FIG. 7 and described above. These are the number one priority for the organization and the subsequent analysis focuses on identifying key user groups, customer groups that may be contributing to the low scores to allow the organization to prioritize in the allotment of resources. The first step is the generation of a Lifecycle-Profile Map. Although this method can be applied across any of the scores and groups from the population, the most benefit has been derived in applying this method to the relationships in the CRITICAL quadrant 720 of the relationship map 700.

The analysis presented is based on the simple percept of satisfaction in the present context being reasonably volatile and dependent on the lifecycle phase that the relationship is in and on the changing expectations of respondent profiles, a further analysis is carried out subsequent to the external surveys for a lifecycle-profile match. The analysis is carried out with the data points received as a part of the survey and thus represents the state of the relationship at a particular point of time of conducting the external survey. The periodicity of this analysis would be the same as the periodicity of the external surveys.

The population in the present case is taken to be that of all the customers falling in the CRITICAL quadrant 720 as mapped in the previous stage of analysis. In this analysis, the externally reported scores of satisfaction from individual respondents in customer organizations are used and consolidated as shown in Table 2 below.

TABLE 2

|  | PROFILE 1 (P1) | PROFILE 2 (P2) | ... | PROFILE n (Pn) |
|---|---|---|---|---|
| Lifecycle Phase 1 (LP1) | ΣCSI[EXT][LP1][P1] | ΣCSI[EXT][LP1][P2] | ... | ΣCSI[EXT][LP1][Pn] |
| Lifecycle Phase 2 (LP2) | ΣCSI[EXT][LP2][P1] | ΣCSI[EXT][LP2][P2] | ... | ΣCSI[EXT][LP2][Pn] |
| ... | ... | ... | ... ... | |
| Lifecycle Phase m (LPm) | ΣCSI[EXT][LPm][P1] | ΣCSI[EXT][LPm][P2] | ... | ΣCSI[EXT][LPm][Pn] |

Each of the individual figures is the satisfaction score of all respondents from across the entire sampled customer base, consolidated over the Lifecycle Phase of the relationship and the Profile of the respondent. For example, the Lifecycle stages identified could be Sales, Delivery and Support and the Profiles could be End-Users, Functional Heads, and Top Management. In this case, the Lifecycle-Profile map would consist of nine values ranging from the consolidated score of all 'End-User' respondents from customers in the 'Sales' Lifecycle phase to that of all 'Top Management' respondents from customers in the 'Support' phase of the relationship lifecycle.

Such an analysis throws up specific areas where the organization needs to focus on in terms of specific Lifecycle-Profile combinations that are scoring low compared to the others. These low scoring areas provide an effective filtering mechanism before the actual product/service attribute satisfaction levels in individual cases are looked at. It should be noted that at this stage of the analysis, the averaging out of scores across respondent profiles and lifecycle phases might tend the even out some critical responses from key respondents within organizations. Hence, while this analysis works in identifying and prioritizing areas of concern, the riding factor is that all the customers in this sample are in the CRITICAL quadrant 720 and remedial action needs to be initiated even if through a case by case detailed analysis of responses.

A more generic extension of the above explained Lifecycle-Profile Map 700, is the Respondent-Cluster Plot described below with reference to FIG. 8. In an exactly similar method as elaborated above, individual Lifecycle-Profile scores are calculated as shown in Table 3 below. However in this case, the entire surveyed population of customers is taken as the base. The calculation of the individual cell scores can be done in a number of ways, including, but not limited to (1) a simple average of all scores satisfying the two criteria of lifecycle phase and respondent profile group and (2) a weighted average of the scores satisfying the criteria where the weights are simply the customer importance scores.

What has been observed though is that the inclusion of the importance scores as weights in the calculation of the averages does not add significant value to the analysis and in some cases, given the desired objectives of this analysis, dilutes the scores by skewing the averages towards a few indicative and very important accounts. The desired result of this exercise is to discover specific trends in product/service satisfaction levels across respondent groups and lifecycles that can provide the organization with valuable qualitative input on broader ranging improvement initiatives that need to be undertaken. Instead, it is suggested that if required, the plots be made separately for the two importance groups (as determined by the importance baseline).

TABLE 3

|  | PROFILE 1 (P1) | PROFILE 2 (P2) | ... | PROFILE n (Pn) | Lifecycle totals |
|---|---|---|---|---|---|
| Lifecycle Phase 1 (LP1) | CSI[EXT][LP1][P1] | CSI[EXT][LP1][P2] | ... | CSI[EXT][LP1][Pn] | CSI[EXT][LP1] |
| Lifecycle Phase 2 (LP2) | CSI[EXT][LP2][P1] | CSI[EXT][LP2][P2] | ... | CSI[EXT][LP2][Pn] | CSI[EXT][LP2] |
| ... | ... | ... | ... ... | | ... |
| Lifecycle Phase m (LPm) | CSI[EXT][LPm][P1] | CSI[EXT][LPm][P2] | ... | CSI[EXT][LPm][Pn] | CSI[EXT][LPm] |
| Profile Totals | CSI[EXT][P1] | CSI[EXT][P2] | ... | CSI[EXT][Pn] | |

The lifecycle and profile totals are calculated as weighted averages as shown below.

Lifecycle Score $$CSI[EXT][LPx] = \frac{\sum [n[LPx][Pm] * CSI[EXT][LPx][Pm]]}{\sum n[LPx][Pm]}$$

Respondent Profile Score $$CSI[EXT][Px] = \frac{\sum [n[LPm][Px] * CSI[EXT][LPm][Px]]}{\sum n[LPm][Px]}$$

Where m=1, 2, ..., n where n is the number of lifecycle phases/respondent profiles and [LPi][Pj] is the number of respondents (scores) belonging to Lifecycle LPi and Respondent Profile Group Pj.

Using these figures, a Respondent Cluster Plot can be generated as shown in the hypothetical example illustrated in FIG. 8.

As shown, such a cluster plot 800 yields several insights into the satisfaction of customers across lifecycle phases and respondent profile groups that form a very solid foundation to developing a comprehensive model of the drivers of satisfaction across the entire life of a customer relationship. The analysis of this plot is done through two main methods.

The first includes an analysis of the clustering of scores from a particular lifecycle or a particular respondent group. For example, in the graph 800, it can be seen that respondents across a particular lifecycle LP1 810 tend to cluster in the low size, low CSI area. This could yield some interesting results for an organization. For example consider the Pre-Sales stage of the lifecycle. While for an organization, this will form a very small part of their sampling base in the satisfaction survey (as most of them are still considered prospects and not active customers) a low satisfaction score in this group might be indicative of a lack in quality of the organization's response to RFPs (Request For Proposal). This in turn will be a critical area for the organization to work on as RFP processes tend to be long and a large component of the acquisition cost of the organization. Responses of poor quality will eventually result in a large number of prospects not getting converted into customers.

The second portion of the analysis includes an analysis of 'High Impact' Clusters, which are the clusters that due to their size make up for most of the momentum in the satisfaction scores across the organization. In the graph 800, these are those clusters that fall above the dividing line 830 (which has been chosen in this case to isolate the top 20% of the entire sample size). Movements in these clusters have the largest impact on the overall satisfaction measures of the organization.

In summary, this invention has described three simple but effective mechanisms for the monitoring of customer satisfaction in an enterprise solution provider context. The mechanisms have been presented in a generic manner to improve its applicability across varying business scenarios. Also, in practice, there are varying levels of depth at which the three analysis models as given below can be applied. For example, analysis models can be reflected in a relationship plot, as shown in FIG. 7, in a respondent cluster plot, as illustrated in FIG. 8, and in a lifecycle-profile map, as generally described above.

In practice, these models have been used at the organizational level, the individual product suite/service level and across geographies. These models can be applied across any such cross section of customers or products or geographies that the organization considers pertinent to the analysis.

It should also be appreciated that although the foregoing description has been provided in terms regarding processes, flows, and methods that can be performed, that the embodiments of the invention extends to methods, systems and computer program products for providing customer relationship evaluation. The embodiments of the present invention may comprise, for example, a special purpose or general-purpose computer including various computer hardware.

In particular, as described above, embodiments of the invention include methods in which data is either gathered and/or processed to obtain measured results. Each of these described methods can be implemented with the use of one or more computing devices, computing networks, and one or more computer-readable media for carrying or having computer-executable instructions or data structures stored thereon, such as, but not limited to the data that is accessed and utilized by the computing systems to implement the methods of the invention, and which is described above.

As defined herein, computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. These computer-readable media, as well as other storage media can also store any of the data or metrics corresponding to the data described above, including, but not limited to data corresponding to customer bases, customers, customer satisfaction levels, customer importance scores, satisfaction and importance baselines, classifications, external satisfaction scores, priority action areas, respondent profiles and lifecycle stages. Accordingly, whenever any act or step is implemented that involves any of the foregoing data, or any other data described above, the corresponding acts and steps can include storing and/or accessing this data from storage.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

In summary, the present invention provides advantages over the prior art which provides very little in terms of practical applications for the effective evaluation of customer relationships in a business-to-business context. In particular, conventional systems are designed around assumptions of individual consumption and decision making that does not exist in the business-to-business context. These systems and methods also focus on the generation of overall measures of satisfaction that serve little or no use in the subsequent action that the organization needs to take.

One benefit of the present invention is that, apart from capturing satisfaction measures from multiple sources, both internal and external to the organization, it introduces a measure of customer importance. These importance scores help prioritize relationships and eventually optimize the use of organizational resources. The use of measures from multiple sources, including boundary employees from within the organization enables a more frequent evaluation of relationships, preventing minor issues from snowballing into causes of dissatisfaction. The multiple source measurement also helps eliminate any personal respondent biases that might exist as an effect of individual motivations and responsibilities.

The analysis framework presented in the invention revolves around the fundamental concept that satisfaction in a business-to-business context is determined, apart from individual biases, by the lifecycle stage of the customer and the key expectations that exist during the stage. The analysis framework both increases the reliability of any average scores calculated by taking these expectations into account, also improves the organizations long term understanding of customer expectations across lifecycle stages, respondent profiles, and specific products/services. The invention covers all levels of analysis requirements from the identification of critical relationships requiring immediate review based on present feedback to the identification of satisfaction drivers and trends across particular respondent profiles (for any combination of geography, product/service, etc.) or lifecycle stages. Similar analyses done on specific attributes of performance and satisfaction help generate useful information on aspects like the referencing and cross-selling potential of customers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable media storing computer-executable instructions which when executed by a computing system causes the computing system to implement a method for providing a framework for analyzing business-to-business relationships in an organization, said method comprising:

identifying a customer base that includes a plurality of customers of an organization for which a relationship is to be analyzed;

identifying, for each customer, a customer satisfaction level representing a level of satisfaction of the customer with said organization in a past duration, wherein said identifying comprises:

collecting information from each of a plurality of key internal contacts with the customer and also representatives of a customer organization, wherein the plurality of key internal contacts include both relationship managers and account mentors; and forming a first satisfaction index for the relationship managers and a second satisfaction index for the account mentors, and then an internal satisfaction index as a weighted average of the first satisfaction index and the second satisfaction index; and computing the level of satisfaction of the customer based on the internal satisfaction index and an external satisfaction index representing the satisfaction level of representatives of the customer organization;

assigning for each customer, a customer importance score representing an importance of the customer to said organization, wherein the customer importance score is based on a length of a relationship of the customer with said organization, a breadth of the relationship, revenues earned from the customer, and an internal assessment of strategic value of the customer to the organization;

identifying satisfaction and importance baselines;

classifying each of the plurality of customers into one of four quadrants of a graph based upon the customer satisfaction level and the customer importance score corresponding to each customer and as compared against the satisfaction and importance baselines, wherein the four quadrants of said graph are formed by two axes, wherein the satisfaction and importance baselines represent the two axes of the graph, and wherein said classifying includes identifying critical customers having both a low customer satisfaction level and a high customer importance score as compared to the satisfaction and importance baselines;

gathering, for each critical customer, corresponding external satisfaction scores; and generating priority action areas with a higher probability for said critical customers compared to customers determined not to be critical, wherein said generating comprises:

identifying combinations of stages of a relationship lifecycle and profile types of the customers, wherein said stages of the relationship lifecycle contains at least sales, delivery and support, and wherein said profile types of the customers contains at least top management respondents and end user respondents;

aggregating the external satisfaction scores of the critical customers for each of the identified combinations to generate data representing a corresponding aggregate value for each combination; and analyzing the data for trends, wherein the priority action areas are determined based on the trends.

2. The computer program product of claim 1, wherein said internal satisfaction index is calculated based on periodic reporting on key parameters of health of the relationship from at least one key customer facing employees of the organization, and wherein said key parameters of the health of the relationship comprise operational parameters of performance, strategic parameters and behavioral indicators.

3. The computer program product of claim 1, wherein said external satisfaction index is calculated based on periodic surveys on key relationship parameters from a defined cross-section of respondents from within the customer organization, and wherein said key relationship parameters include at least one of product attributes, service attributes, rankings on importance, performance indicators, and behavioral indicators.

4. The computer program product of claim 1, wherein said internal satisfaction index and said external satisfaction index are calculated based on a performance disaggregation technique comprising:

assigning weights to operational, strategic and behavioral parameters of satisfaction;

utilizing a weighted average method, and with a total weight of the behavioral parameters being equal to or greater than a total weight of the operational parameters, for both said internal satisfaction index and said external satisfaction index.

5. The computer program product of claim 1, further comprising:

normalizing and comparing said internal satisfaction index and said external satisfaction index across all of the plurality of customers; and isolating cases with a difference between the normalized internal satisfaction index and external satisfaction index that is considered to be significant based on an indication of changes in the cases' immediate past;

performing separate analysis on the isolated cases, wherein a causal analysis of the isolated cases leads to identification of incidents having significant influence on customer satisfaction based on the significant difference.

6. The computer program product of claim 1, wherein assigning a Customer Importance score comprises rating each of the plurality of customers on a scale of one to one hundred based on various parameters that define a value of each customer to the organization and wherein said rating assigns a score defined by a formula comprising $$\text{CUST.IMP.}=[w(\text{length})*\text{LENGTH}+w(\text{breadth})*\text{BREADTH}+\text{SIZE}*[w(ws)*\text{WALLET}(t)+w(ews)*\text{WALET}(t+1)]+w(\text{stratval})*\text{STRATVAL}]*100,$$

wherein LENGTH is a relationship length in time compared to internal benchmarks, BREADTH is a portfolio of products and services in use by a customer, WALLET (t) is the organization's wallet share of a customer's spending in a past period, WALLET(t+1) is an organization's expected wallet share of a customer's planned budget for a next period, SIZE is a size of a particular customer account in absolute terms as compared to internal benchmarks, STRATVAL is an assessment of the strategic value a relationship holds for an organization, wherein w(length) is a weight assigned to the relationship length, w(breadth) is a weight assigned to breadth, w(ws) is a weight assigned to the wallet(t), w(ews) is a weight assigned to the wallet(t+1), and w(stratval) is a weight assigned to the strategic value and, wherein w(length)+w(breadth)+w(ws)+w(ews)+w(stratval)=1.

7. The computer program product of claim 1, wherein said four quadrants of said graph comprises a first quadrant corresponding to low satisfaction and low importance, a second quadrant corresponding to high satisfaction and low importance, a third quadrant corresponding to low satisfaction and high importance, and a fourth quadrant corresponding to high satisfaction and high importance,
    wherein said critical customers are located in said third quadrant.

8. The computer program product of claim 1, wherein said aggregating is performed using a weighted approach with cluster sizes serving as weights,
    wherein said aggregating is performed across a plurality of separate customer bases, each corresponding to a different scenario.

9. A method of providing a framework for analyzing business-to-business relationships in an organization, said method comprising:
    identifying a customer base that includes a plurality of customers of an organization for which a relationship is to be analyzed;
    identifying, for each customer, a customer satisfaction level representing a level of satisfaction of the customer with said organization in a past duration, wherein said identifying comprises:
        collecting information from each of a plurality of key internal contacts with the customer and also representatives of a customer organization, wherein the plurality of key internal contacts include both relationship managers and account mentors; and
        forming a first satisfaction index for the relationship managers and a second satisfaction index for the account mentors, and then an internal satisfaction index as a weighted average of the first satisfaction index and the second satisfaction index; and
        computing the level of satisfaction of the customer based on the internal satisfaction index and an external satisfaction index representing the satisfaction level of representatives of the customer organization;
    assigning, in a computer system, for each customer, a customer importance score representing an importance of the customer to said organization, wherein the customer importance score is based on a length of a relationship of the customer with said organization, a breadth of the relationship, revenues earned from the customer, and an internal assessment of strategic value of the customer to the organization;
    identifying satisfaction and importance baselines;
    classifying in the computer system, each of the plurality of customers into one of four quadrants of a graph based upon the customer satisfaction level and the customer importance score corresponding to each customer and as compared against the satisfaction and importance baselines, wherein the four quadrants of said graph are formed by two axes, wherein the satisfaction and importance baselines represent the two axes of the graph, and wherein said classifying includes identifying critical customers having both a low customer satisfaction level and a high customer importance score as compared to the satisfaction and importance baselines;
    gathering, for each critical customer, corresponding external satisfaction scores; and
    generating in the computer system, priority action areas with a higher probability for said critical customers compared to customers determined not to be critical, wherein said generating comprises:
        identifying combinations of stages of a relationship lifecycle and profile types of the customers, wherein said stages of the relationship lifecycle contains at least sales, delivery and support, and wherein said profile types of the customers contains at least top management respondents and end user respondents;
        aggregating the external satisfaction scores of the critical customers for each of the identified combinations to generate a data representing a corresponding aggregate value for each combination; and
        analyzing the data for trends, wherein the priority action areas are determined based on the trends.

10. The method of claim 9, wherein said internal satisfaction index is calculated based on periodic reporting on key parameters of health of the relationship from at least one key customer facing employees of the organization, and
    wherein said key parameters of the health of the relationship comprise operational parameters of performance, strategic parameters and behavioral indicators.

11. The method of claim 9, wherein said external satisfaction index is calculated based on periodic surveys on key relationship parameters from a defined cross-section of respondents from within the customer organization, and
    wherein said key relationship parameters include at least one of product attributes, service attributes, rankings on importance, performance indicators, and behavioral indicators.

12. The method of claim 9, wherein said internal satisfaction index and said external satisfaction index are calculated based on a performance disaggregation technique comprising:
    assigning weights to operational, strategic and behavioral parameters of satisfaction;
    utilizing a weighted average method, and with a total weight of the behavioral parameters being equal to or greater than a total weight of the operational parameters, for both said internal satisfaction index and said external satisfaction index.

13. The method of claim 9, further comprising:
    normalizing and comparing said internal satisfaction index and said external satisfaction index across all of the plurality of customers; and
    isolating cases with a difference between the normalized internal satisfaction index and external satisfaction index that is considered to be significant based on an indication of changes in the cases' immediate past;
    performing separate analysis on the isolated cases,
    wherein a causal analysis of the isolated cases leads to identification of incidents having significant influence on customer satisfaction based on the significant difference.

14. The method of claim 9, wherein assigning a Customer Importance score comprises rating each of the plurality of customers on a scale of one to one hundred based on various parameters that define a value of each customer to the organization and wherein said rating assigns a score defined by a formula comprising $$\text{CUST.IMP.} = [w(\text{length}) * \text{LENGTH} + w(\text{breadth}) * \text{BREADTH} + \text{SIZE} * [w(ws) * \text{WALLET}(t) + w(ews) * \text{WALLET}(t+1)] + w(\text{stratval}) * \text{STRATVAL}] * 100,$$

wherein LENGTH is a relationship length in time compared to internal benchmarks, BREADTH is a portfolio of products and services in use by a customer, WALLET (t) is the organization's wallet share of a customer's spending in a past period, WALLET(t+1) is an organization's expected wallet share of a customer's planned budget for a next period, SIZE is a size of a particular customer account in absolute terms as compared to internal benchmarks, STRATVAL is an assessment of the strategic value a relationship holds for an organization, wherein w(length) is a weight assigned to the relationship length, w(breadth) is a weight assigned to breadth, w(ws) is a weight assigned to the wallet(t), w(ews) is a weight assigned to the wallet(t+1), and w(stratval) is a weight assigned to the strategic value and, wherein w(length)+w(breadth)+w(ws)+w(ews)+w(stratval)=1.

15. The method of claim 9, wherein said four quadrants of said graph comprises a first quadrant corresponding to low satisfaction and low importance, a second quadrant corresponding to high satisfaction and low importance, a third quadrant corresponding to low satisfaction and high importance, and a fourth quadrant corresponding to high satisfaction and high importance, wherein said critical customers are located in said third quadrant.

16. A computing system providing a framework for analyzing business-to-business relationships in an organization, said computing system comprising:

a computer readable media storing one or more instructions; and a processor to execute said one or more instructions, wherein execution of said one or more instructions causes the computing system to perform the actions of:

identifying a customer base that includes a plurality of customers of an organization for which a relationship is to be analyzed;

identifying, for each customer, a customer satisfaction level representing a level of satisfaction of the customer with said organization in a past duration, wherein said identifying comprises:

collecting information from each of a plurality of key internal contacts with the customer and also representatives of a customer organization, wherein the plurality of key internal contacts include both relationship managers and account mentors; and forming a first satisfaction index for the relationship managers and a second satisfaction index for the account mentors, and then an internal satisfaction index as a weighted average of the first satisfaction index and the second satisfaction index; and computing the level of satisfaction of the customer based on the internal satisfaction index and an external satisfaction index representing the satisfaction level of representatives of the customer organization;

assigning for each customer, a customer importance score representing an importance of the customer to said organization, wherein the customer importance score is based on a length of a relationship of the customer with said organization, a breadth of the relationship, revenues earned from the customer, and an internal assessment of strategic value of the customer to the organization;

identifying satisfaction and importance baselines;

classifying each of the plurality of customers into one of four quadrants of a graph based upon the customer satisfaction level and the customer importance score corresponding to each customer and as compared against the satisfaction and importance baselines, wherein the four quadrants of said graph are formed by two axes, wherein the satisfaction and importance baselines represent the two axes of the graph, and wherein said classifying includes identifying critical customers having both a low customer satisfaction level and a high customer importance score as compared to the satisfaction and importance baselines;

gathering, for each critical customer, corresponding external satisfaction scores; and generating priority action areas with a higher probability for said critical customers compared to customers determined not to be critical, wherein said generating comprises:

identifying combinations of stages of a relationship lifecycle and profile types of the customers, wherein said stages of the relationship lifecycle contains at least sales, delivery and support, and wherein said profile types of the customers contains at least top management respondents and end user respondents;

aggregating the external satisfaction scores of the critical customers for each of the identified combinations to generate a data representing a corresponding aggregate value for each combination; and analyzing the data for trends, wherein the priority action areas are determined based on the trends.

17. The computing system of claim 16, wherein said internal satisfaction index is calculated based on periodic reporting on key parameters of health of the relationship from at least one key customer facing employees of the organization, and wherein said key parameters of the health of the relationship comprise operational parameters of performance, strategic parameters and behavioral indicators.

18. The computing system of claim 16, wherein said external satisfaction index is calculated based on periodic surveys on key relationship parameters from a defined cross-section of respondents from within the customer organization, and wherein said key relationship parameters include at least one of product attributes, service attributes, rankings on importance, performance indicators, and behavioral indicators.

19. The computing system of claim 16, wherein said internal satisfaction index and said external satisfaction index are calculated based on a performance disaggregation technique comprising:

assigning weights to operational, strategic and behavioral parameters of satisfaction;

utilizing a weighted average computing system, and with a total weight of the behavioral parameters being equal to or greater than a total weight of the operational parameters, for both said internal satisfaction index and said external satisfaction index.

20. The computing system of claim 16, further comprising:

normalizing and comparing said internal satisfaction index and said external satisfaction index across all of the plurality of customers; and isolating cases with a difference between the normalized internal satisfaction index and external satisfaction index that is considered to be significant based on an indication of changes in the cases' immediate past;

performing separate analysis on the isolated cases, wherein a causal analysis of the isolated cases leads to identification of incidents having significant influence on customer satisfaction based on the significant difference.

21. The computing system of claim 16, wherein assigning a Customer Importance score comprises rating each of the plurality of customers on a scale of one to one hundred based on various parameters that define a value of each customer to the organization and wherein said rating assigns a score defined by a formula comprising $$\text{CUST.IMP.} = [w(\text{length}) * \text{LENGTH} + w(\text{breadth}) * \text{BREADTH} + \text{SIZE} * [w(ws) * \text{WALLET}(t) + w(ews) * \text{WALET}(t+1)] + w(\text{stratval}) * \text{STRATVAL}] * 100,$$

wherein LENGTH is a relationship length in time compared to internal benchmarks, BREADTH is a portfolio of products and services in use by a customer, WALLET (t) is the organization's wallet share of a customer's spending in a past period, WALLET(t+1) is an organization's expected wallet share of a customer's planned budget for a next period, SIZE is a size of a particular customer account in absolute terms as compared to internal benchmarks, STRATVAL is an assessment of the strategic value a relationship holds for an organization, wherein w(length) is a weight assigned to the relationship length, w(breadth) is a weight assigned to breadth, w(ws) is a weight assigned to the wallet(t), w(ews) is a weight assigned to the wallet(t+1), and w(stratval) is a weight assigned to the strategic value and, wherein w(length)+w(breadth)+w(ws)+w(ews)+w(stratval)=1.

22. The computing system claim 16, wherein said four quadrants of said graph comprises a first quadrant corresponding to low satisfaction and low importance, a second quadrant corresponding to high satisfaction and low importance, a third quadrant corresponding to low satisfaction and high importance, and a fourth quadrant corresponding to high satisfaction and high importance,
   wherein said critical customers are located in said third quadrant.

23. The computer program product of claim 22, wherein said aggregating is performed using a weighted approach with cluster sizes serving as weights,
   wherein said aggregating is performed across a plurality of separate customer bases, each corresponding to a different scenario.

24. The method of claim 9, wherein said aggregating is performed using a weighted approach with cluster sizes serving as weights,
   wherein said aggregating is performed across a plurality of separate customer bases, each corresponding to a different scenario.

* * * * *